G. C. Taft. Variable crank for Boring machines.
PATENTED
DEC 10 1867
3760
REISSUED DEC 14 1869
72114
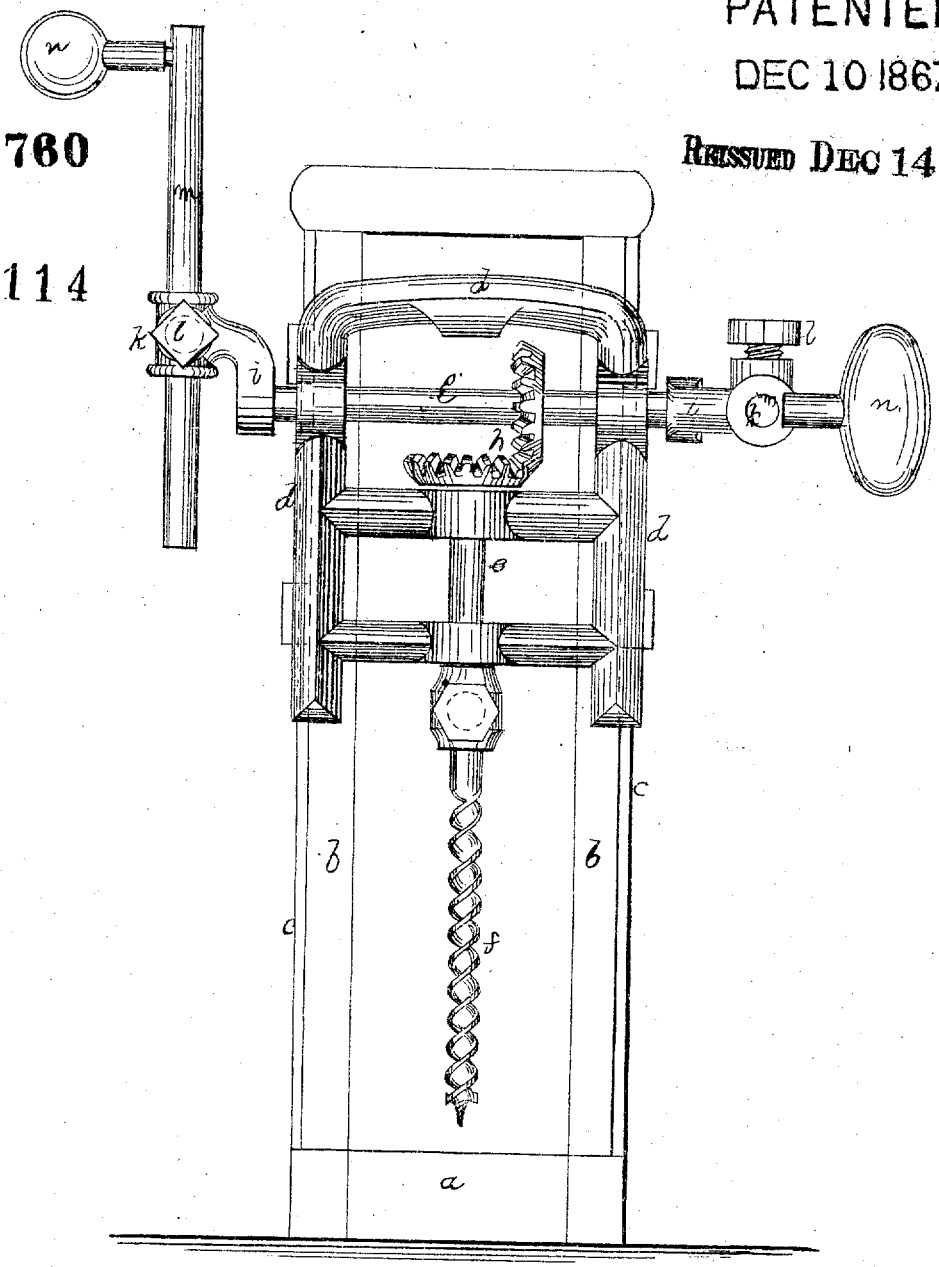
Witnesses.
Chas H Smith
Geo D Wheeler
G. C. Taft
per L. M. Denell
Atty

United States Patent Office.

THEODORE MACE, OF NEW YORK, N. Y., ASSIGNEE OF GEORGE C. TAFT.

*Letters Patent No.* 72,114, *dated December* 10, 1867; *reissue No.* 3,760, *dated December* 14, 1869.

IMPROVEMENT IN VARIABLE CRANK FOR BORING-MACHINES.

The Schedule referred to in these Letters Patent and making part of the same.

*To all whom it may concern:*

Be it known that GEORGE C. TAFT, of Worcester, in the State of Massachusetts, did invent a certain new and useful Variable Crank for Boring-Machines; and the following is hereby declared to be a full, clear, and exact description of the said invention, reference being had to the annexed drawing, making part of this specification, wherein a boring-machine is represented, with the improved cranks applied thereto.

In the boring-machines heretofore constructed, the cranks have been of a definite length, and hence, in boring large-sized holes, the labor is very severe, because there is not sufficient leverage by the cranks; and the contrary is the case in boring small holes, there being a loss of time, because the workman's hands have to move through an unnecessarily large circle.

The nature of the said invention consists in a variable crank or cranks combined with the boring-machine, and constructed in such a manner that the handle may be placed at any desired distance from the axis, whereby a large leverage can be obtained for heavy work, or a short leverage employed for light work, so that the hands of the workman will only have to describe the proper-sized circle to produce the power required in rotating the auger or drill.

In the drawing—

*a* represents the base, *b*, the standards, and *c* the slides, receiving the frame *d*, spindle *e*, auger *f*, horizontal shaft *g*, and gearing *h*. These parts being of any usual or desired character, do not require further description as to their construction or mode of operation, they being well known and in use.

The variable cranks are each shown as made of an arm *i*, keyed or otherwise secured upon the ends of the shaft, and at the end of an arm, *i*, is a hub, *k*, standing at right angles to the shaft *g*, and provided with a clamping-bolt or screw, *l*.

*m* is a rod, either round or polygonal, passing through the hub *k*; and

*n* is a handle, of any suitable size or shape, standing off at right angles to the rod *m*, (and these cranks are shown as placed at right angles to each other on the ends of the shaft *g*.)

It will now be understood that the handle *n* can be placed at any desired distance from the axis or shaft *g*, by sliding the rod *m* in the hub *k*, and clamping it, and thereby the leverage applied to rotate the drill or auger can be varied as desired, for the purposes aforesaid.

What is claimed and to be secured by Letters Patent, is—

1. Combining with the shaft *g* and gearing of the boring-machine, a crank-handle that is variable in its length, so that the leverage of the crank may be adapted to the work to be performed by the boring-tool, substantially as specified.

2. The arm *i*, attached at the end of the shaft *g*, and provided with the hub *k*, through which passes the rod *m*, to the handle *n*, substantially as set forth.

Dated August 24, 1869.

THEODORE MACE.

Witnesses:

GEO. D. WALKER,
CHAS. H. SMITH.